United States Patent
Chen

(10) Patent No.: US 6,883,078 B2
(45) Date of Patent: Apr. 19, 2005

(54) MICROCOMPUTER WITH REDUCED MEMORY USAGE AND ASSOCIATED METHOD

(75) Inventor: Pei-Chao Chen, Taipei (TW)

(73) Assignee: BenQ Corporation, Tao-Yuan Hsien (TW)

(*) Notice: Subject to any disclaimer, the term of this patent is extended or adjusted under 35 U.S.C. 154(b) by 461 days.

(21) Appl. No.: 10/063,448

(22) Filed: Apr. 24, 2002

(65) Prior Publication Data

US 2002/0169923 A1 Nov. 14, 2002

(30) Foreign Application Priority Data

May 11, 2001 (TW) ........................................ 90111351 A

(51) Int. Cl.[7] ............................................. G06F 12/00
(52) U.S. Cl. ......................... 711/165; 711/103; 713/2; 714/38
(58) Field of Search ................................. 711/165, 103; 713/2; 714/38

(56) References Cited

U.S. PATENT DOCUMENTS 6,243,809 B1 * 6/2001 Gibbons et al. ............... 713/1

FOREIGN PATENT DOCUMENTS

TW 426851 3/2001

* cited by examiner

Primary Examiner—Reginald G. Bragdon
(74) Attorney, Agent, or Firm—Winston Hsu

(57) ABSTRACT

A microcomputer has a flash memory, a volatile memory, and a processor. The flash memory stores a flash memory driver for controlling operations of the flash memory so as to write data into the flash memory. The flash memory driver and related common functions are duplicated in the volatile memory to prevent the processor from reading any data from the flash memory when the processor executes the flash memory driver to write data into the flash memory.

16 Claims, 4 Drawing Sheets

MICROCOMPUTER WITH REDUCED MEMORY USAGE AND ASSOCIATED METHOD

BACKGROUND OF INVENTION

1. Field of the Invention

The present invention relates to a microcomputer and associated method, and more particularly, to a microcomputer and associated method for reducing memory usage of the microcomputer.

2. Description of the Prior Art

With advances of integrated circuit technology, more and more microcomputer systems are used to assist the operations of devices, such as cell phones, air conditioners, scanners, routers, etc. However, in contrast to personal computer systems, microcomputer systems have fewer transistors, and so their related power consumption is less. Furthermore, the design of microcomputers is relatively simple, so their applications have more potential for variety than personal computer systems. Microcomputer systems are generally designed to provide users with great flexibility when setting up their systems. Microcomputer systems are designed to permit users to setup a storage device to store settings. Of various storage devices, flash memory is often used as the storage device of a microcomputer system due to the nonvolatile nature of flash memory, and due to their stability in operating. Flash memory in a microcomputer system is used to store programs that control the microcomputer system, such as boot programs, flash memory drivers, etc. The flash memory driver is used to control the writing of data into the flash memory. In particular, flash memory has a limitation in that when data is written into the flash memory, data cannot be read from the flash memory. Attempting to read and write data from the flash memory at the same time may lead to corruption of data within the flash memory. However, when the microcomputer system executes the flash memory driver to write data into the flash memory, program code for the flash memory driver must be read to execute the writing of data. This, of course, cannot be permitted. So, to ensure the accuracy of writing data, the prior art microcomputer system copies all programs in the flash memory to another storage device, and then reads from that storage device to execute the flash memory driver so as to avoid the above-mentioned problem.

Please refer to FIG. 1. FIG. 1 is a block diagram of a prior art microcomputer 10. The microcomputer 10 is used by network data equipment, such as model FCD E320/E321 of Acer Communications & Multimedia Inc.® (now known as BenQ Corp.®). It comprises a central processing unit (CPU) 12 to control operations of the microcomputer 10, a first chip 16 with a flash memory 26, a second chip 14 with a memory 24, an address bus 18 for delivering memory address signals, and a data bus 22 for delivering data stored in the flash memory 26 and the memory 24. The flash memory has a system program 28 for controlling operations of the microcomputer 10, a data file 36 for storing settings of the microcomputer 10, and a flash memory driver 32 for controlling operations of the flash memory 26 so that data can be written into the data file 36. The memory 24 is a volatile memory, such as dynamic random access memory (DRAM). The processor 12 can temporarily store data in the memory 24.

When the microcomputer system 10 starts, the processor 12 loads the system program 28 and the flash memory driver 32 in the flash memory 26 into the memory 24. Please refer to FIG. 2. FIG. 2 is a memory map of the memory 24 and flash memory 26 of FIG. 1. As shown in FIG. 2, the flash memory 26 has an address space from 0x80000 to 0xFFFFF, and the memory 24 has an address space from 0x00000 to 0x7FFFF. The flash memory driver 32 is stored in memory from 0x80400 to 0x8FFFF, which is in the flash memory 26. The system program 28 is stored in memory from 0x90000 to 0xF7FFF, which is in the flash memory 26. The data file 36 is stored in the flash memory 26 from 0xF8000 to 0xFAFFF. When the microcomputer 10 begins operation, the processor 12 loads all programs (e.g. the system program 28 and the flash memory driver 32, etc.) in the flash memory 26 into the memory 24. As shown in FIG. 2, the processor 12 loads the system program 28 into the memory 24 located in the address of 0x10000 to 0x77FFF, and loads the flash memory driver 32 into the memory 24 from 0x00400 to 0x0FFFF. When the processor 12 executes program code, the processor 12 reads from the address space corresponding to the memory 24. Consequently, when the processor 12 executes the flash memory driver 32 to write data into the data file 36 of the flash memory 26, the processor 12 reads program code for the flash memory driver 32 from the memory address area 0x00400~0x0FFFF. In this manner, the microcomputer 10 does not need to read program code for the flash memory driver 32 from the flash memory 26 when writing data into the data file 26, and the accuracy of data writing into the flash memory 26 is ensured. However, because the processor 12 loads all code in the flash memory 26 into the memory 24, when the flash memory 26 has more program codes, the microcomputer 10 must be equipped with a larger total memory capacity.

SUMMARY OF INVENTION

It is therefore a primary objective of the present invention to provide a method for reducing memory usage of the microcomputer to solve the above-mentioned problems.

According to the claimed invention, a microcomputer has a flash memory, a volatile memory, and a processor. The flash memory stores a flash memory driver for controlling operations of the flash memory so as to write data into the flash memory. The flash memory driver and related programs are duplicated in the volatile memory to prevent the processor from reading any data from the flash memory when the processor executes the flash memory driver to write data into the flash memory.

It is an advantage of the present invention that the method reduces memory requirements of the microcomputer.

These and other objectives and advantages of the present invention will no doubt become obvious to those of ordinary skill in the art after having read the following detailed description of the preferred embodiment that is illustrated in the various figures and drawings.

DETAILED DESCRIPTION

Figure 1:
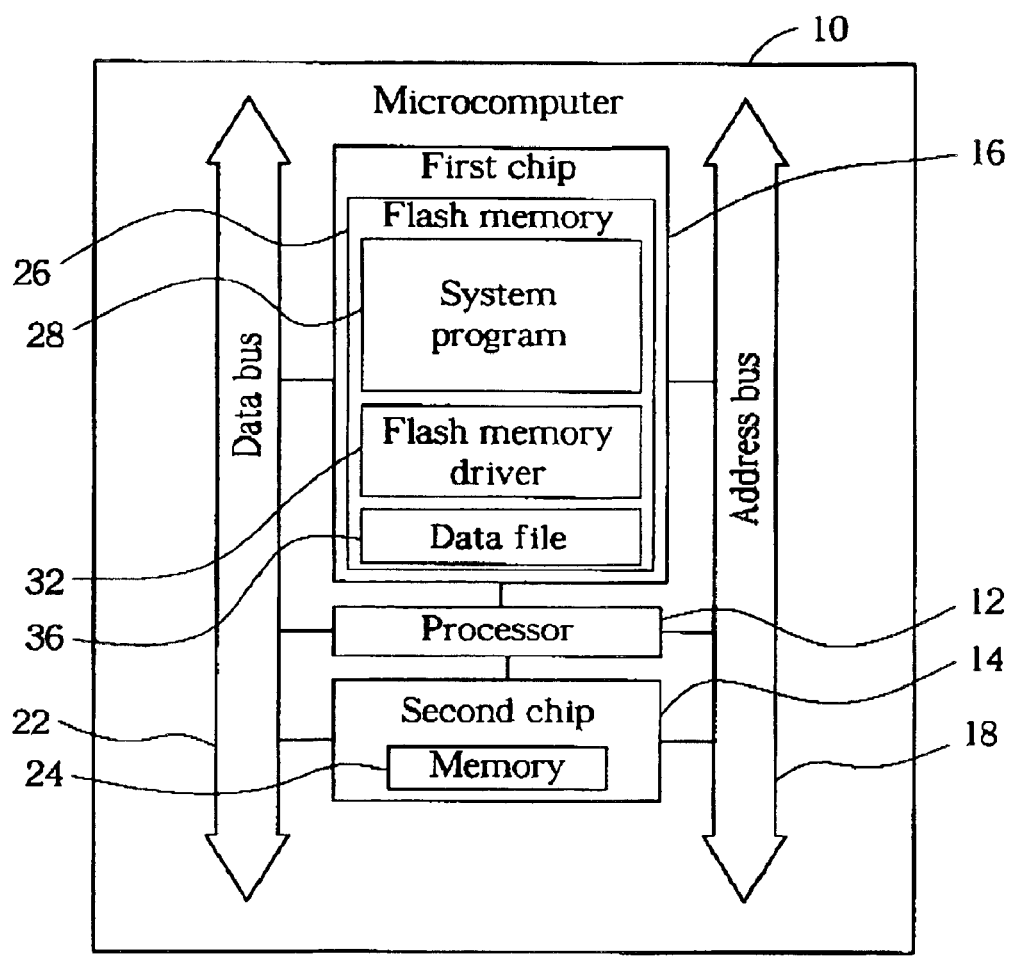
FIG. 1 is a block diagram of a prior art microcomputer.
Figure 2:
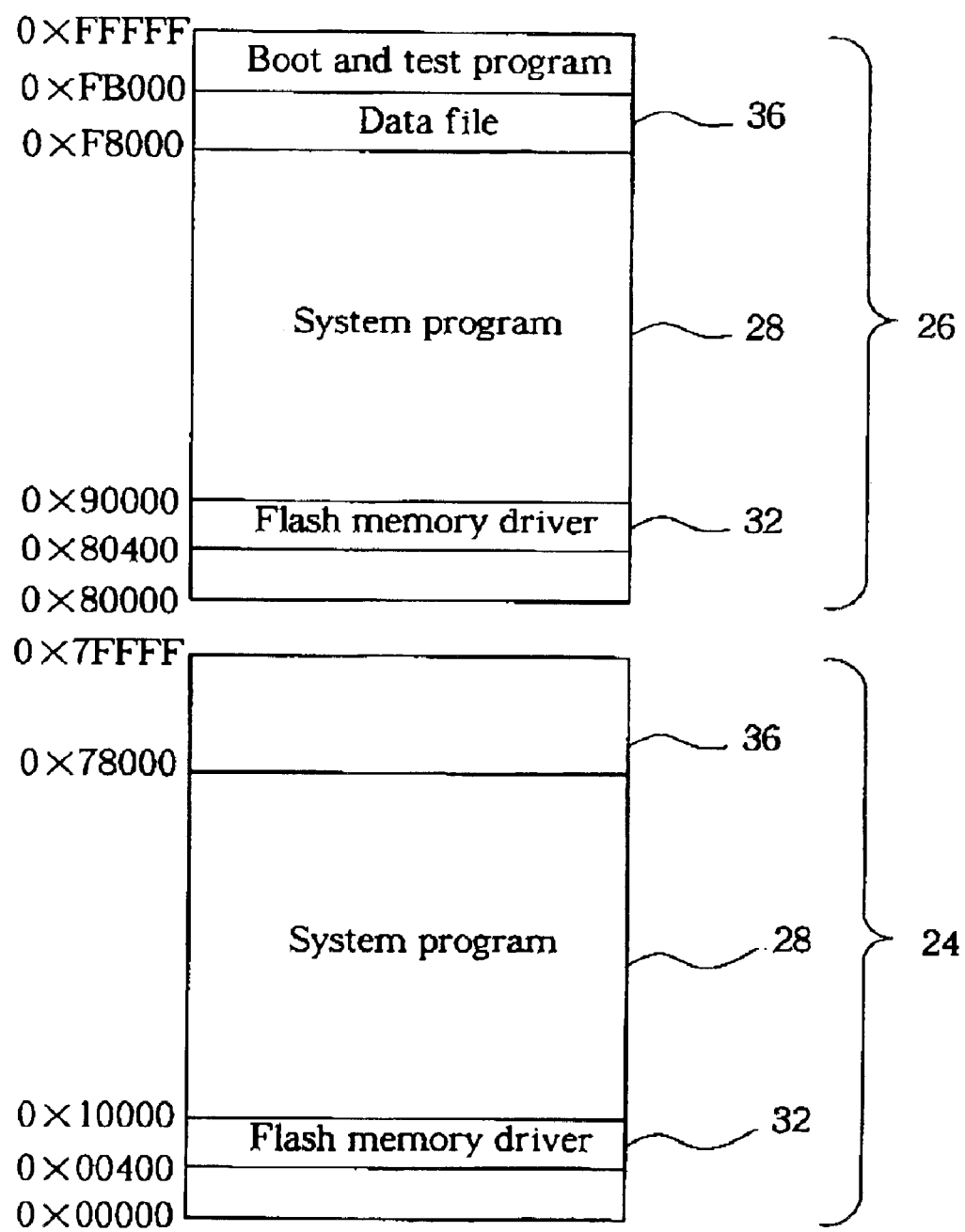
FIG. 2 is a memory map of the memory and flash memory in FIG. 1.
Figure 3:
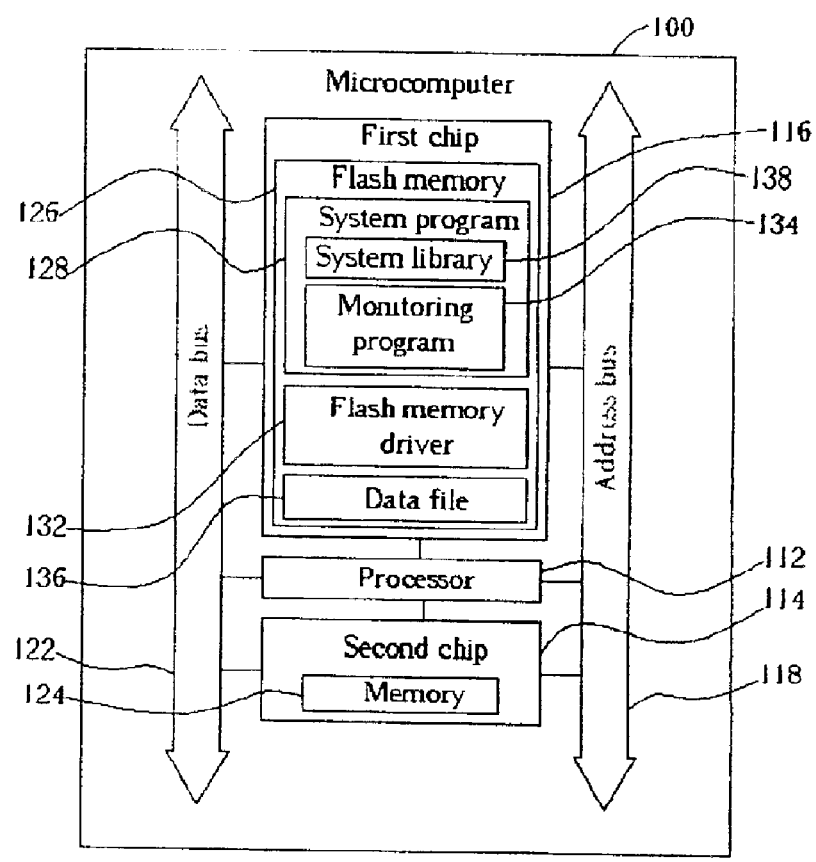
FIG. 3 is a block diagram of the present invention microcomputer.

Please refer to FIG. 3. FIG. 3 is a block diagram of a present invention microcomputer 100. The microcomputer 100 comprises a processor 112 for controlling operations of the microcomputer 100, a first chip 116 with a flash memory 126, a second chip 114 with a memory 124, an address bus 118 for delivering memory address signals, and a data bus 122 for delivering data stored in the flash memory 126 and the memory 124. The flash memory 126 has a system program 128 for controlling the operations of the microcomputer 100, a data file 136 for storing settings of the microcomputer 100, and a flash memory driver 132 for controlling the operations of the flash memory 126 and writing data into the data file 136. The system program 128 comprises a system library 138 that stores system functionality. The system program 128 and the flash memory driver 132 are executed as part of common functionality of the system library 138 by a way of procedure calling. The memory 124 is a volatility memory, such as dynamic random access memory (DRAM). The processor 112 uses the memory 124 to temporarily store data and code.

Figure 4:
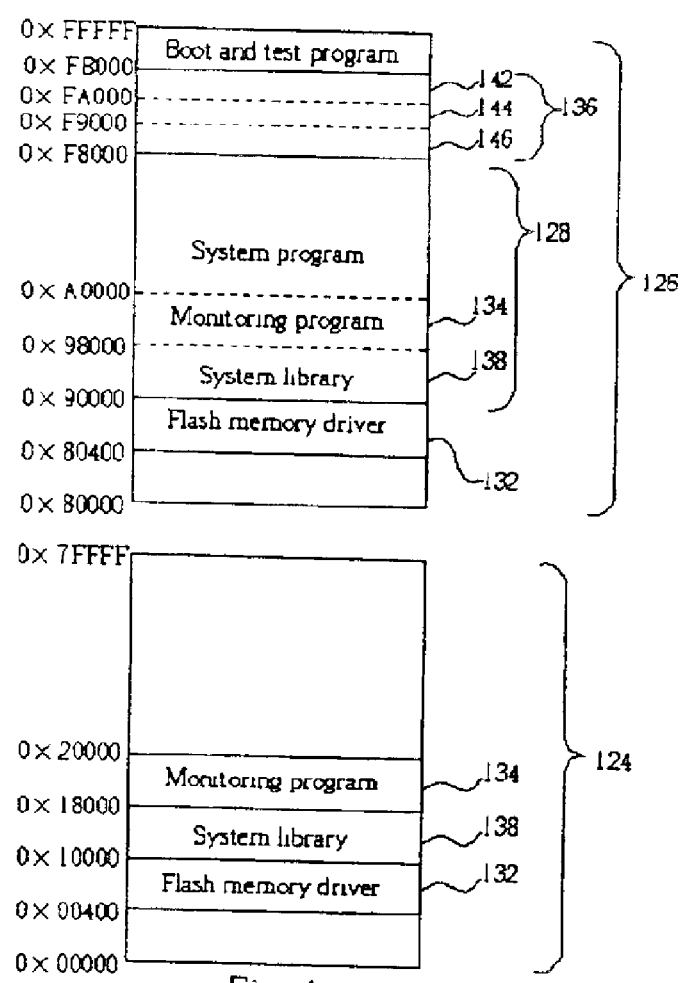
FIG. 4 is a memory map of the memory and flash memory in FIG. 3.

The microcomputer 100 can be used to control the operations of network data equipment (not shown). When the network data equipment boots, the processor 112 loads the flash memory driver 132 stored in the flash memory 126 into the memory 124. Please refer to FIG. 4. FIG. 4 is a memory map of the memory 124 and flash memory 126. As shown in FIG. 4, the flash memory 126 has an address space from 0x80000 to 0xFFFFF, and the memory 124 has an address space from 0x00000 to 0x7FFFF. The flash memory driver 132 is stored in the flash memory 126 from 0x80400 to 0x8FFFF. The system program 128 is stored in the flash memory 126 from 0x90000 to 0xF7FFF. The data file 136 is stored in the flash memory 126 from 0xF8000 to 0xFAFFF. When the microcomputer 100 begins operations, the processor 112 loads the flash memory driver 132 into the memory 124 located in the address of 0x00400 to 0x0FFFF. When the processor 112 executes the flash memory driver 132 to write data into the data file 136, the processor 112 reads the program code of the flash memory driver 132 from the memory address area 0x00400 to 0x0FFFF. The microcomputer 100 thus does not need to read program code of the flash memory driver 132 in the flash memory 126 to write data to the data file 136, and the accuracy of writing data into the data file 136 is thus ensured. When the processor 112 executes the flash memory driver 132 in the memory 124, the flash memory driver 132 will call some functions in the system program 128. To avoid the flash memory 126 miswriting data because of any calling of functions of the system program 128 in the flash memory 126, the processor 112 loads the system library 138 with the common functions of the system program 128 into the memory address area 0x10000 to 0x17FFF of the memory 124. When the flash memory driver 132 needs to call the functions of the system program 128, the related common functions are obtained from the system library 138 of the memory address area 0x10000 to 0x17FFF. Data miswriting into the flash memory 126 is thus avoided. In contrast to the prior art microcomputer 100, when the processor 112 of the microcomputer 100 executes the system program 128 to control the operations of the microcomputer 100, the processor 112 reads related data from the memory address area 0xA0000~0xF7FFF in the flash memory 126. Therefore, in contrast to the prior art microcomputer 100, which loads all program code of the system program 28 into the memory 24, the present invention microcomputer 100 only loads part of the system program 128, which is read by the processor 112 (e.g. the system library 138), into the memory 124. Therefore, the microcomputer 100 requires a smaller memory 124 than the memory 24, yet offers the same functionality of the microcomputer 100. In this manner, the total memory capacity of the microcomputer 100 can be reduced.

As the mentioned above, the present invention method to reduce the total memory capacity of the microcomputer 100 comprises: (A) when the microcomputer 100 starts, loading the flash memory driver 132 and the system library 138 into the memory 124; (B) when the processor 110 writes data into the data file 136 of the flash memory 126, make the processor 122 read the flash memory driver 132 from the memory 124 to execute the flash memory driver 132; (C) when the flash memory driver 132 calls the system library 138, make the flash memory driver 132 call the system library 138 stored in the memory 124; and (D) when the processor 110 executes the system program 128, make the processor 110 read the system program 128 from the flash memory 126.

Before the processor 112 executes the system program 128, the processor 112 delivers related address signals to the flash memory 126 through the address bus 118 to read the system program 128 from the flash memory address area 0xA0000 to 0xF7FFF. After the flash memory 126 receives the related address signals, program code of the system program 128 is sent to the processor 112 through the data bus 122. Similarly, before the processor 112 executes the flash memory driver 132, the processor 112 delivers related address signals to the memory 124 through the address bus 118 to read the flash memory driver 132 from the memory address area 0x00400 to 0x0FFFF. After the memory 124 receives the related address signals, the program code of the flash memory driver 132 is sent to the processor 112 through the data bus 122.

As shown in FIG. 3, the system program 128 further comprises a monitoring program 134 named "watchdog". When the processor 112 executes the system program 128, the processor 112 repetitively executes the monitoring program 134 to ensure the accuracy of the system program 128. However, because the monitoring program 134 is repetitively executed by the processor 112, the processor 112 will repetitively read the monitoring program 134. To avoid the processor 112 from reading the monitoring program 134 from the flash memory 126 when the flash memory driver 132 is being executed to write data into the flash memory 126, after the microcomputer 100 starts, the processor 112 must duplicate the monitoring program 134 into the memory address area 0x18000 to 0x1FFFF of the memory 124 from the flash memory 126. The monitoring program 134 is then read from the memory address area 0x18000~0x1FFFF for execution.

The above-mentioned programs are all generated by a compiler. Before the compiler generates each program, programmers must process linking and location information so that when the microcomputer 100 starts, the processor 112 will load the flash memory driver 132, the common system library 138, and the monitoring program 134 into the corresponding memory address areas of the memory 124. When the processor 112 executes the related programs, the processor 112 reads program code from preplanned memory address areas. Furthermore, the compiler not only generates the flash memory driver 132 and the system library 138, but also generates the flash memory driver 132 with function calls to the common system library 138 in the memory 124. In this manner, the flash memory driver 132 does not need to call related functions from the full system library 138 of the flash memory 126, and the processor 112 does not need to load the full system library 138 of the flash memory 126 into the memory 124.

For convenience, the microcomputer 100 can be designed so that users can store different setting parameters to meet different needs. To achieve this, the data file 136 can be divided into a plurality of blocks to store different setting parameters. As shown in FIG. 4, the data file 136 can be divided into a plurality of data blocks 142, 144, 146, wherein each data block can store a particular set of setting parameters, and each setting parameter corresponds to a different respective operating mode. The user can store the most common setting parameters into the data blocks 142, 144, 146. When the operating mode of the microcomputer 100 is switched, the processor 112 simply reads setting parameters from one of the respective data blocks 142, 144, 146. Particularly, most flash memories comprise a plurality of sectors, and the flash memory performs writing in units of a sector. When data is written into a sector, all data in the sector is erased. New data is then written into the sector. However, each set of setting parameters of the microcomputer 100 may be quite small. If each sector of the flash memory 126 is larger, the time to store data is longer, and also leads to wasting of the memory space. Therefore, when designing the microcomputer 100, a flash memory with a smaller sector size is usually chosen, such as flash memory model SST28SF040A/SST28VF040A of Silicon Storage Technology, Inc.

In the contrast to the prior art microcomputer, the present invention only loads related programs for flash memory writing into the non-volatile memory to avoid any miswriting of data into the flash memory. Therefore, the present invention method offers a microcomputer with a smaller memory design, yet with the same functionality.

Those skilled in the art will readily observe that numerous modification and alterations of the device may be made while retaining the teachings of the invention. Accordingly, the above disclosure should be construed as limited only by the metes and bounds of the appended claims.

What is claimed is:

1. A method for reducing memory usage of a microcomputer, the microcomputer comprising:
   a flash memory for storing:
      a data file for saving setting parameters of the microcomputer;
      a flash memory driver for controlling operations of the flash memory so as to write data into the flash memory; and
      a system program for controlling operations of the microcomputer, the system program comprising a system library wherein when the processor executes the flash memory driver, the flash memory driver is capable of calling the system library;
   a secondary memory far storing programs and data; and
   a processor for executing the system program to control the operations of the microcomputer;
   the method comprising:
   loading the flash memory driver and the system library into the secondary memory when the microcomputer is turned on while loading less than all of the system program stored in the flash memory into the secondary memory;
   restricting the processor to read the flash memory driver only from the secondary memory to execute so as to write data into the data file stored in the flash memory;
   restricting the processor to read the system program from the flash memory to execute so as to control the operations of the microcomputer; and
   restricting the flash memory driver to call the system library only from the secondary memory.

2. The method of claim 1 wherein the flash memory further stores a monitoring program that is capable of being executed by the processorperiodically for checking whether the system program is executed correctly, the method further comprising:
   loading the monitoring program into the secondary memory when the microcomputer is turned on; and
   restricting the processor to read the monitoring program only from the secondary memory to execute so as to check whether the system program is executed correctly.

3. The method of claim 1 wherein the secondary memory is a volatile memory.

4. The method of claim 1 wherein the system program is stored in a first memory region of the flash memory, and the processor uploads the flash memory driver into a second memory region of the secondary memory.

5. The method of claim 4 wherein the microcomputer further comprises an address bus for transmitting address signals, the method further comprising:
   transmitting address signals to die flash memory via the address bus so as to read the system program from the first memory region before the processor executes the system program; and
   transmitting address signals to the secondary memory via the address bus so as to read the flash memory driver from the second memory region before the processor executes the flash memory driver.

6. The method of claim 1 wherein the microcomputer further comprises a data bus for transmitting data stored in the secondary memory and the flash memory, the method further comprising:
   transmitting code of the system program stored in the flash memory to the processor via the data bus before the processor executes the system program;
   transmitting code of the flash memory driver stored in the secondary memory to the processor via the data bus before the processor executes the flash memory driver.

7. The method of claim 1 wherein the microcomputer further comprises a first chip and a second chip, the flash memory being formed in the first chip, and the secondary memory being formed in the second chip.

8. The method of claim 1 wherein the microcomputer is used for controlling operations of a network transmission device.

9. A microcomputer comprising:
   a flash memory for storing:
      a data file for saving setting parameters of the microcomputer;
      a flash memory driver for controlling operations of the flash memory so as to write data into the flash memory; and
      a system program for controlling operations of the microcomputer, the system program comprising a system library;
   a secondary memory for storing programs and data; and
   a processor for executing the system program to control the operations of the microcomputer;
   wherein when the microcomputer is turned on, the processor uploads the flash memory driver and the system library into the secondary memory while loading less than all of the system program stored in the flash memory into the secondary memory, the processor being restricted to read the flash memory driver from the secondary memory when executing the flash memory driver so asto write data into the data file, the flash memory driver being capable of calling the system library from the secondary memory, and being restricted to call the system library only from the secondary memory when the processor executes the flash memory driver to write data into the data file, the processor also being restricted to read the system program from the flash memory when terminating execution of the flash memory driver and executing the system program to control the operations of the microcomputer.

10. The microcomputer of claim 9 wherein the flash memory further stores a monitoring program that is capable of being executed by the processorperiodically for checking whether the system program is executed correctly, and when the microcomputer is turned on, the monitoring program is loaded into the secondary memory, the processor being restricted to read the monitoring program from the secondary memory when the processor executes the flash memory driver to write data into the data file.

11. The microcomputer of claim 9 wherein the secondary memory is a volatile memory.

12. The microcomputer of claim 9 wherein the system program is stored in a first memory region of the flash memory, and the flash memory driver is uploaded into a second memory region of the secondary memory by the processor.

13. The microcomputer of claim 12 further comprising an address bus for transmitting address signals, the processor transmitting address signals to the flash memory via the address bus so as to read the system program from the first memory region before executing the system program, and the processor transmitting address signals to the secondary memory via the address bus so as to read the flash memory driver from the second memory region before executing the flash memory driver.

14. The microcomputer of claim 12 further comprising a data bus for transmitting data stored in the secondary memory and the flash memory, the flash memory transmitting corresponding code of the system program to the processor via the data bus before the processor executes the system program, and the secondary memory transmitting corresponding code of the flash memory driver stored in the flash memory to the processor via the data bus before the processor executes the flash memory driver.

15. The microcomputer of claim 9 further comprising a first chip and a second chip, the flash memory being formed in the first chip, and the secondary memory being formed in the second chip.

16. The microcomputer of claim 9 wherein the microcomputer is used for controlling operations of a network transmission device.

* * * * *